Jan. 17, 1939.   F. G. FOLBERTH ET AL   2,144,454
WINDSHIELD CLEANER
Filed June 3, 1935   5 Sheets-Sheet 2

Inventors
FREDERICK G. FOLBERTH
& WILLIAM M. FOLBERTH

Richey Watts
Attorneys

Jan. 17, 1939.   F. G. FOLBERTH ET AL   2,144,454
WINDSHIELD CLEANER
Filed June 3, 1935   5 Sheets-Sheet 3

Inventors
FREDERICK G. FOLBERTH
& WILLIAM M. FOLBERTH

Richey & Watts
Attorneys

Patented Jan. 17, 1939

2,144,454

UNITED STATES PATENT OFFICE 2,144,454

WINDSHIELD CLEANER

Frederick G. Folberth and William M. Folberth, Cleveland, Ohio

Application June 3, 1935, Serial No. 24,624

5 Claims. (Cl. 15—255)

This invention relates to apparatus for removing rain, snow, sleet, etc., from the windshield or windows of an automotive vehicle and more particularly to an improved form of windshield cleaner adapted to be operated by the pressure difference existing between the atmosphere and the intake manifold of the internal combustion engine of an automotive vehicle.

The usual type of windshield cleaner used on automobiles today consists of a fluid pressure actuated motor, either of the reciprocating or vane piston type, which swings an arm carrying a rubber squeegee or the like through an arc on the outer surface of the windshield. These windshield cleaners clean only a semi-circular area immediately in front of the driver. If it is desired to clean more of the area of the windshield it is necessary to install an additional motor and squeegee in front of the passenger's seat. Even with such an arrangement only two semi-circular areas on the windshield are cleaned and the result is relatively poor visibility, particularly when wet snow which clings to the windshield is falling.

In the usual type of windshield cleaner above referred to, in which the squeegee moves in a semi-circular path and cleans a substantially semi-circular area on the windshield, the squeegee is constantly in contact with the outside of the windshield glass. During a portion of the stroke of the wiper or squeegee, regardless of whether the wiper swings from the bottom or the top of the glass, the squeegee is moving upwardly. The result of this is that water or snow which has been removed from the windshield on the downward stroke of the squeegee may be again carried back up over the clean surface on the upward stroke of the squeegee.

In order to overcome the disadvantages and defects of the above noted types of windshield cleaners we have devised an improved windshield cleaner which is adapted to clean substantially the entire surface of an automobile windshield and which overcomes the trouble which occurs when the squeegee moves upwardly over the surface of the windshield glass.

It is among the objects of our invention to provide an improved windshield cleaner in which the squeegee engages the glass only on the downward stroke and is removed from the glass during the upward portions of its movement. Other objects of our invention are: the provision of a windshield cleaner which is adapted to clean substantially the entire surface of a windshield of the shape and proportions usual on present day automobiles; the provision of an improved windshield cleaner which is entirely automatic in operation and which derives its operating force from the pressure differential between the atmosphere and the intake manifold of an automotive vehicle; the provision of a windshield cleaner which, when not in use, may be withdrawn to a position completely out of the range of vision of the vehicle operator so that it does not in any way interfere with normal driving; the provision, in a windshield cleaner of the vacuum or pressure actuated type, of a valve operating mechanism such that the movement of the valve to shift the movement of the wiper from one direction to the opposite direction cannot take place until the wiper has moved substantially to its limit in the first direction regardless of the speed of operation of the device; the provision of a windshield wiper in which the moving parts are enclosed and which is adapted to give long and trouble-free service.

The above and other objects of our invention will appear from the following description of one embodiment thereof, reference being had to the accompanying drawings, in which—

Figure 8 is a section taken on line 8—8 of Figure 2.

Figure 12 is a sectional view looking into the valve mechanism taken on line 12—12 of Figure 2 and illustrating the entire mechanism in assembled position with the valve cover plate on.

Figure 13 is a fragmentary cross section taken on line 13—13 of Figure 2 but illustrating the valve completely assembled.

Figure 22 is a detached elevation of a piston control valve guiding member.

Figure 23 is a section taken on line 23—23 of Figure 22.

Figure 27 is a detached elevation of the oscillating yoke which actuates the valve mechanism.

Figure 28 is a section taken on line 28—28 of Figure 27.

Figure 1:
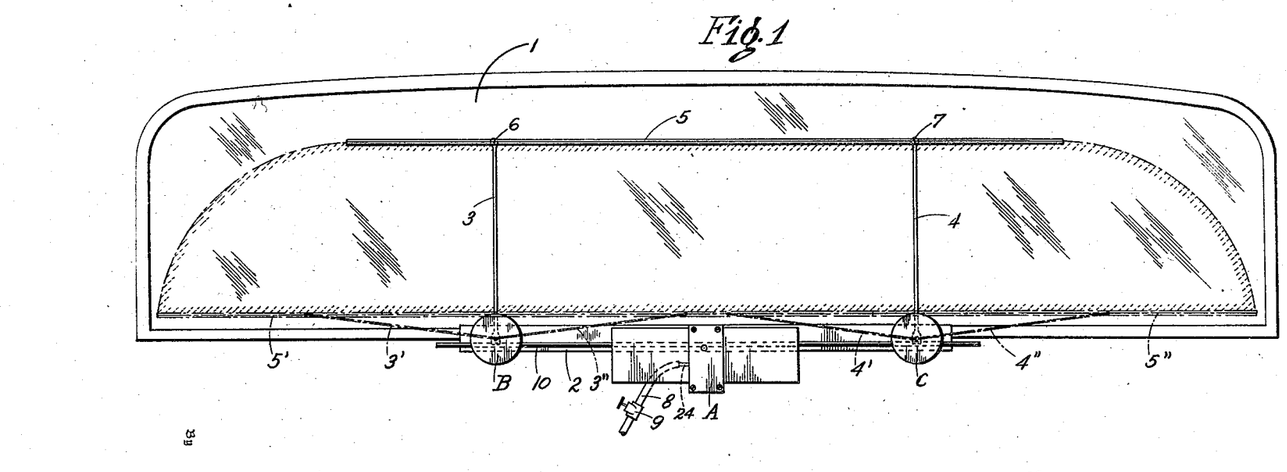
Figure 1 is a rear elevation, looking from the driver's seat, showing our improved windshield cleaner installed on the windshield of an automobile and illustrating the area adapted to be cleaned by the squeegee.

Referring now to the drawings, particularly to Figure 1, the windshield illustrated at 1 may be of any suitable shape and size. By varying the length of our squeegee bar 5 and the degree of angular movement of the squeegee operating arms 3 and 4 our cleaner may be adapted to clean a greater or less area of a windshield glass of any usual shape, as will appear later. The operating mechanism for our windshield wiper is mounted at the lower edge of the windshield 1 in any suitable manner. In the present instance the operating cylinders and valve mechanism, generally indicated at A, and the squeegee in and out moving devices, generally indicated at B and C, are all mounted on a spacing bar 2 which in turn may be secured either to the bottom of the windshield frame or any other suitable portion of the vehicle. The squeegee operating arms 3 and 4 are disposed on the outside of the windshield (opposite to the side on which the devices A, B and C are disposed) and may be operated by suitable shafts (later described) which extend through to the outside of the windshield frame. The squeegee bar 5 is pivotally attached at 6 and 7 to the operating arms 3 and 4.

It will be seen from Figure 1 that the squeegee bar 5 is attached on the side of the arms 3 and 4 toward the surface of the windshield glass 1. When the arms 3 and 4 are moved about the centers of the devices B and C from the dotted position indicated at 3' and 4' to the dotted positions indicated at 3'' and 4'' the squeegee bar 5 will move from the position indicated at 5' to the position indicated at 5'' and the shaded portion on the windshield 1 will be swept by the squeegee. Inasmuch as the arms 3 and 4 are always parallel to each other, as will later appear, the squeegee 5 will always be maintained in a horizontal plane. The pipe or tube 8 is preferably connected to the intake manifold of the internal combustion engine of the vehicle on which the apparatus is installed. It will be understood, however, that any other source of lower than atmospheric pressure might be utilized. It will also be understood that, if desired, our apparatus might readily be adapted to be operated by the pressure differential between a source of greater than atmospheric pressure and atmospheric pressure.

The shut-off valve 9 in the pipe 8 may be used to start and stop the windshield cleaner and to vary its speed of operation by throttling the flow of air through the pipe 8. Assuming that the squeegee 5 and the arms 3 and 4 are in the positions indicated at 5', 3' and 4' and the valve 9 is open to connect the device to the intake manifold suction, the pistons contained in the cylinders will move tht operating rod 10 to the left. This, as will fully appear later, will cause the arms 3 and 4 to move to the right and the squeegee 5 will be lifted. As the arms 3 and 4 continue to swing to the left they and the squeegee 5 will pass through their full line positions in Figure 1 and the squeegee will then start downwardly until it reaches the dotted position 5''.

By means of our improved mechanism, as will clearly appear from the following description thereof, during the upward movement of the squeegee 5 from the position 5' to its full line position (Figure 1) it will be held away from and out of contact with the surface of the windshield. However, as soon as the squeegee reaches its full line position (Figure 1) it will be drawn into cleaning contact with the windshield and will remain in cleaning contact during the downward movement of the squeegee until it reaches the position 5''. When this position is reached the valve mechanism is reversed and the rod 10 will be caused to move to the right. At the same time the squeegee will be moved out of contact with the windshield glass and will remain out of contact as it swings upwardly and to the left into the central full line position of Figure 1. When the central position is reached the squeegee will again be drawn into contact with the glass and will engage it until the position 5' is reached. This cycle of movements will be repeated as long as the device is in operation.

From this explanation it will be seen that the squeegee bar 5 only engages the glass during its downward movement and is completely removed from the glass during all of its upward movement. Thus, any water, snow or the like which strikes the windshield will be scraped down and out of the line of vision of the operator and will not be pushed back up over the windshield during the upward movement of the squeegee as is frequently the case with the usual windshield cleaner.

By properly proportioning the length of the squeegee 5, the length of the arms 3 and 4 and by properly spacing the devices B and C, practically any generally rectangularly shaped windshield or window can be cleaned over substantially its entire surface.

The details of the mechanism of our apparatus will now be explained.

Referring particularly to Figures 2 to 7, the cylinders and valve apparatus indicated at A in Figure 1 comprise a pair of oppositely disposed cylinders 11 and 12, rectangular in cross section, as illustrated but which might, if desired, be made of round or other cross section. The inner ends of these cylinders are flanged as shown at 13 and these flanges are adapted to slide into grooves in the top and bottom walls 14 and 15 of the valve housing and cylinder supporting member which may be generally referred to by D. Pistons 16 and 17 are disposed in the cylinders 11 and 12 respectively and are rigidly connected by the connecting bar 18 so that they move together. From the outer end of the cylinder 11 leads the passage 19 and from the outer end of cylinder 12 a passage 20. These passages are connected by suitable pipes 21 and tubes 22 to the proper ports of the valve mechanism as will be later described. The inner ends of the cylinders 11 and 12 are open and connect directly with the interior of the valve housing D. This housing D may be vented to the atmosphere by suitable apertures 23.

As is best seen in Figures 3 to 7 inclusive the valve housing block D is provided with a number of apertures or passages for the actuating fluid (air in the described embodiment). A tube 24 connects with the passage 25 which in turn connects with the passage 26 having an outlet at the surface 27 of the valve housing block D. Adjacent the hole 26 are similar holes 28 and 29 which extend inwardly from the surface 27 of the block and join the upwardly extending passages 30 and 31 respectively. The upper end of passages 30 and 31 are connected to the surface 27' of the block by passages 32 and 33. A hole 34 is disposed midway between the holes 32 and 33 and connects with the transverse passageway 35 from the opposite ends of which extend the tubes 36 and 37. Leading off from the passages 30 and 31, between their connections with the holes 28, 29, 32 and 33 are the transverse passages 39 and 40 which connect at their outer ends with tubes 41 and 42 respectively.

All of the operating fluid conducting passages have been described in the paragraph above. The block D also contains a number of holes which accommodate certain parts of the mechanism. Extending outwardly from the surface 27' is a projection 43, the lower portion 44 of which extends out beyond the upper portion. A hole 45 extends through this projection 43 and through the wall of the block D. As will later appear this hole serves as a bearing and guide for the main operating shaft of the motor. A transverse hole 46 extends through the block and intersects the hole 45. This hole 46, as will later appear, guides and serves as a bearing for the reciprocating rod member 10, which actuates the wiper mechanism. Immediately below the hole 45 is a smaller hole 47 which supports and guides a valve interlocking device as will be later described. Near the bottom of the surface 27 is a hole 48 having an enlarged outer end portion 49 in which certain parts of our valve mechanism are supported.

Figures 8, 12, 13, 22, 23, 27, 28:
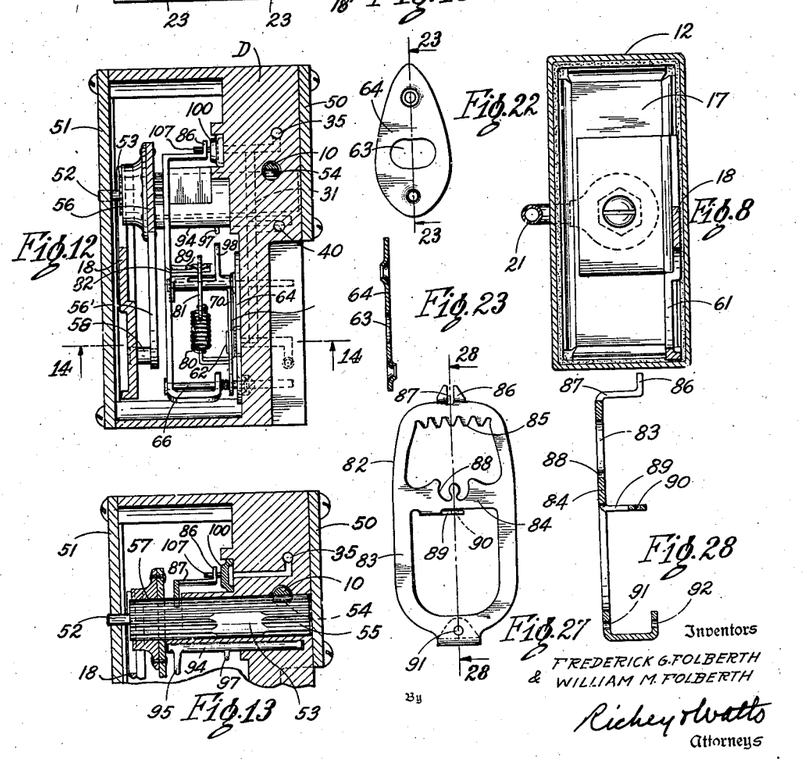

As is seen in Figure 12, cover plates 50 and 51 are secured to the rear and front sides respectively of the valve housing block D. The cover plate 51 is provided with an aperture through which projects the end 52 of the rotatable main shaft member 53. The cover plate 50 serves to maintain the shaft 53 in its position in the hole 45 in the block D. Extending transversely through the hole 46 in the block D is the actuating rod 10 on the central part of which are cut teeth forming a rack which engages the teeth 55 at the front end of the shaft 53.

A double ended actuating lever 56 (see Figure 14) is mounted on the opposite or rear end of the shaft 53. The lever member 56 includes a splined portion 57 which is adapted to fit over the teeth on the end of the shaft 53. It will be seen in Figure 12 that the underside of the lever 56 rests against the portion 44 of the projection 43 and it will be seen that when the arms 56' and 56'' of the lever 56 are oscillated the shaft 53 will be given a corresponding oscillatory movement and, due to the teeth 55 on the shaft and the teeth 54 on the rod 10, this rod 10 will be given a reciprocating movement in the hole 46 of the valve block D. At the ends of the arms 56' and 56'' of the lever 56 are pins 58 and 59 which are adapted to engage slots 60 and 61 in the bar 18 which connects pistons 16 and 17. As is best seen in Figure 15 the connecting bar 18 is formed with an offset portion 18' and the slots 60 and 61 extend into this offset portion. This offset arrangement makes it possible for the pins 58 and 59 of the lever member 56 to enter and leave the slots 60 and 61 as the pistons 16 and 17 move back and forth in the cylinders.

Figure 14:
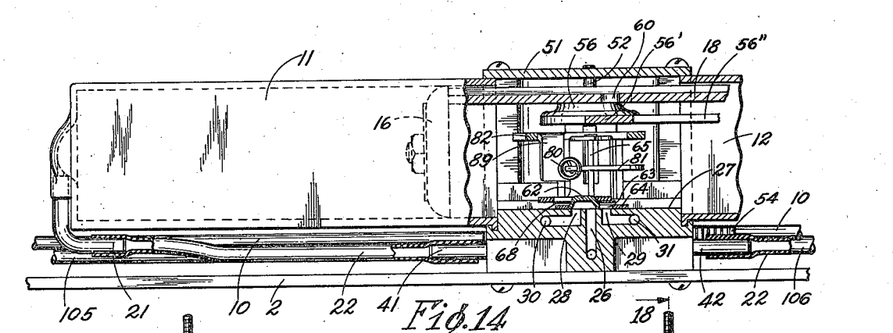
Figure 14 is a fragmentary sectional view taken on line 14—14 of Figures 12 and 2.
Figure 15:
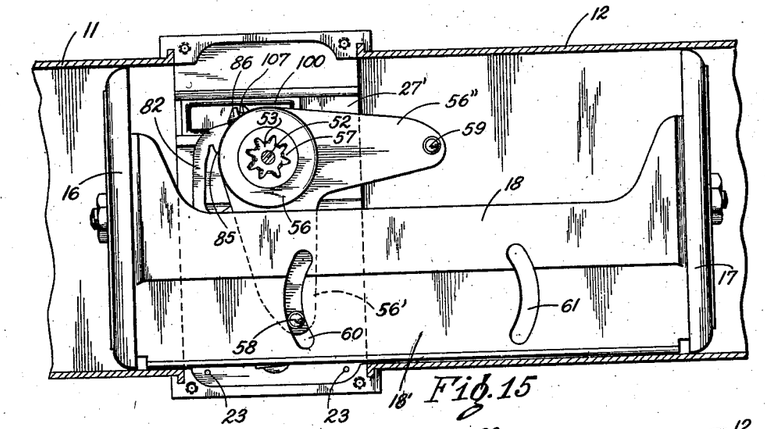
Figure 15 is a view somewhat similar to Figure 2 but illustrating the device with the piston and valve operating mechanism in position.

When the parts are in the positions shown in Figure 14 the next movement of the apparatus will be that of the pistons 16 and 17 to the left. This movement will be transmitted through the engagement of the slot 60 and the pin 58 to the oscillating lever 56 and will cause the shaft 53 to rotate in clockwise direction. As this movement progresses the pin 59 will move in a downward arc and the slot 61 will move to the left. Due to the offset portion of the connecting member 18, the pin 59 will enter the slot 61 before the pin 58 leaves the slot 60 and thus the movement of the pistons 16 and 17 and the connecting bar 18 will be transmitted without interruption to the oscillating lever 56 and the main operating shaft 53.

Figure 2:
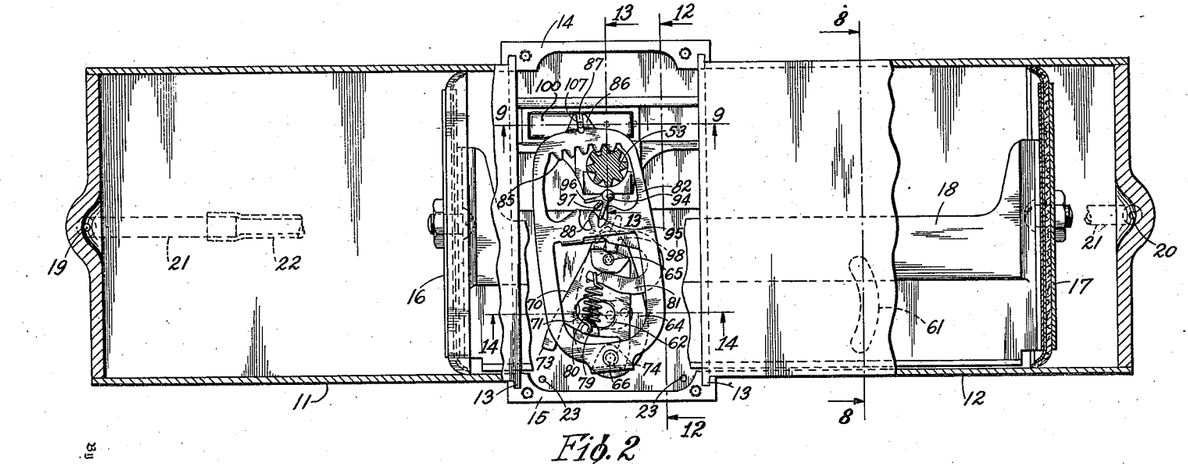
Figure 2 is an enlarged fragmentary view, slightly more than life size, and partly in section, of the cylinders, piston and valve mechanism of the cleaner with the valve cover plate and some of the valve actuating parts removed for the sake of better illustration.
Figure 3:
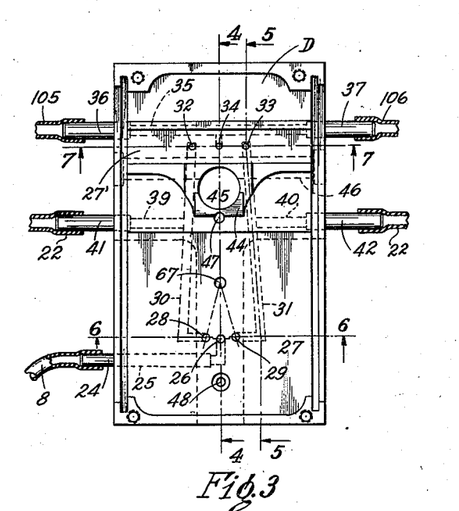
Figure 3 is a detached front elevation of the valve housing block with cover plate removed.
Figure 4:
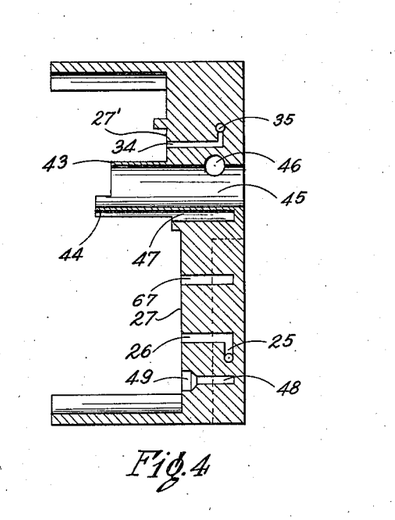
Figure 4 is a section taken on line 4—4 of Figure 3.
Figure 5:
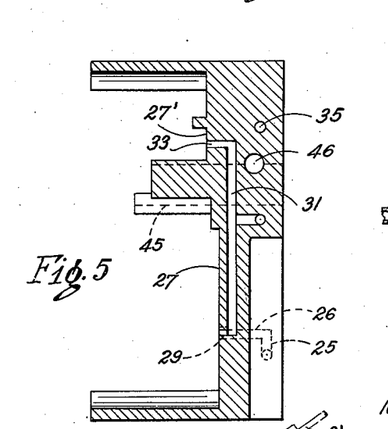
Figure 5 is a section taken on line 5—5 of Figure 3.
Figure 6:
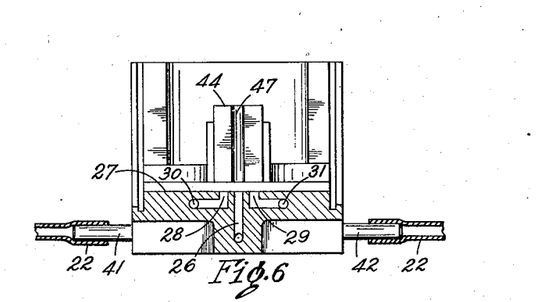
Figure 6 is a section taken on line 6—6 of Figure 3.
Figure 7:
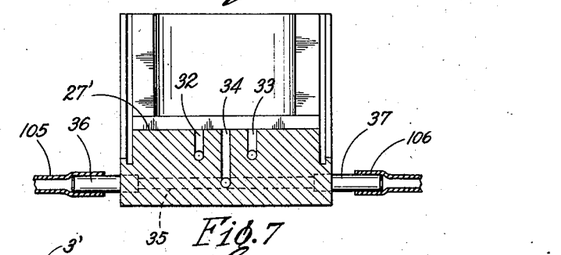
Figure 7 is a section taken on line 7—7 of Figure 3.

We will next describe the valve mechanism by which the proper fluid connections are made to cause reciprocation of the pistons 16 and 17 in their respective cylinders. This valve mechanism is probably best seen in Figures 2, 12 and 13 and consists broadly of a "snap-over" type of valve, operated by the rotation of the shaft 53, which is adapted to instantaneously shift the connection from the intake manifold of the vehicle engine from the cylinder 11 to the cylinder 12 and vice versa. The valve also connects the cylinder, which is not connected to the vacuum, to the atmosphere. The three holes 26, 28 and 29 in the face 27 of the valve block D are spaced so as to make it possible to connect the hole 26, which leads to the intake manifold through the tube 8, to either the hole 28, which leads to the left hand end of the cylinder 11, or the hole 29, which leads to the right hand end of the cylinder 12, through the tubes 22, pipes 21 and openings 19 and 20 respectively. It will be understood that when the hole 26 is connected to the hole 28 (as shown in Figure 2) the reduced pressure in the intake manifold will be applied to the left hand end of the piston 16. As at that time the hole 29 will be exposed to the interior of the valve housing and thus to the atmosphere through the holes 23, the atmospheric pressure will be effective upon the right hand end of the piston 17. Due to this difference in pressure the pistons 16 and 17 and their connecting bar 18 will be moved to the left. Likewise when the hole 26 is connected to the hole 29 and the hole 28 is exposed to the atmosphere the pressure differential will be effective to move the pistons 16 and 17 and the connecting bar 18 to the right (Figure 2).

Figures 16, 18, 19, 24:
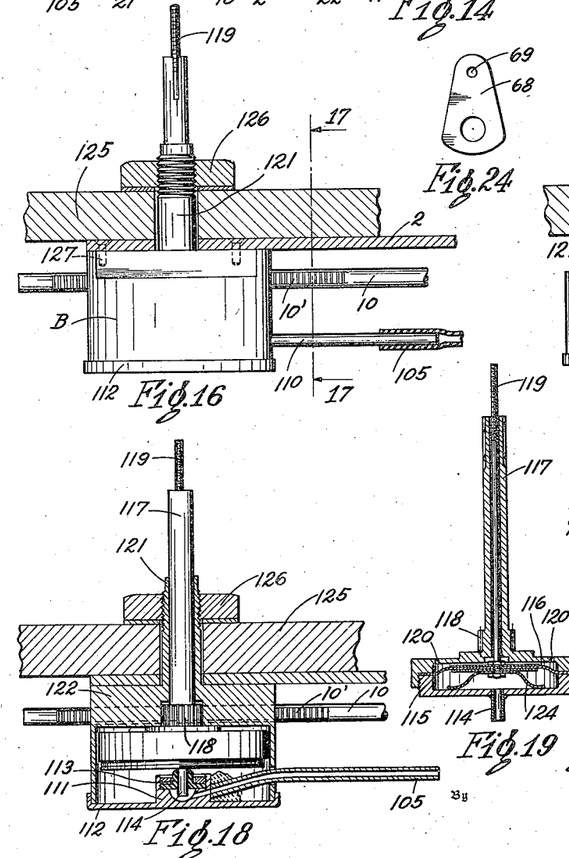
Figure 16 is a plan view, partly in section, illustrating the left hand device for moving the squeegee toward and away from the windshield and for imparting the swinging movement to the squeegee.
Figure 18 is a cross sectional view looking upwardly and taken on line 18—18 of Figure 17.
Figure 19 is a detached cross section of the rotatable diaphragm housing, diaphragm, rotatable squeegee operating shaft and in-and-out squeegee operating shaft.
Figure 24 is a detached elevation of the piston control valve friction member.
Figures 17, 25, 26:
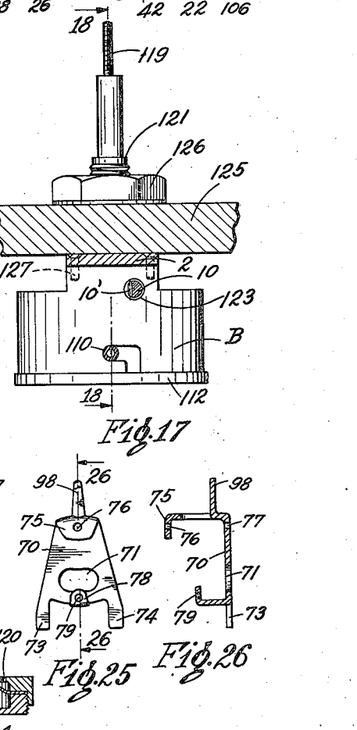
Figure 17 is a view taken on line 17—17 of Figure 16.
Figure 25 is a detached elevation of the piston control valve actuating member.
Figure 26 is a section taken on line 26—26 of Figure 25.

In order to effect these connections between the hole 26 and the holes 28 and 29 we have provided a button shaped valve member 62 (best seen in Figure 14). This button valve 62 is concave on its underside and, as is seen in Figure 14, is adapted to straddle the hole 26 and either of the holes 28 and 29. In Figure 14 (and Figure 2) the button serves to connect the holes 26 and 28 and the hole 29 is connected to the atmosphere. The button valve 62 slides on the surface 27 of the valve block D and is guided in its movement by a suitable slotted aperture 63 in the plate 64. This plate 64 is held in position on the surface 27 by the pins 65 and 66 which extend outwardly from the surface 27 and are supported in the holes 48 and 67. The plate 64 is seen in detached views in Figures 22 and 23. The movement of the button valve 62 is further guided and controlled by the very thin sheet metal friction member 68 (Figure 24) which has a hole adapted to fit over the top of the button valve 62 and another hole 69 which engages the pin 65. Immediately above this thin sheet metal member 68 is disposed the oscillating member 70 which causes the actual movement of the valve button 62. This member 70 is seen in detached views in Figures 25 and 26 and it will be seen that it is provided with a somewhat elongated slot 71 which fits over the top of the button 62. The member 70 is also provided with downwardly extending legs 73 and 74 which are adapted to strike the pin 66 (Figure 2) and limit the movement of the member 70 about the pin 65 on which it is pivoted. As is seen in Figure 26 the member 70 is bent and has a rearwardly extending portion 75 having a hole 76 which together with the hole 77 form bearings for the member 70 on the pin 65. The member 70 also includes a portion which is bent rearwardly just below the slot 71 and is formed with a tab or lug 78 having an aperture 79. One end of the coil spring 80 is secured in the hole 79 and the other end is hooked to the lower end of the horse-shoe shaped member 81. This spring is normally maintained in tension.

The member 70 is caused to swing back and forth about the pin 65 as a pivot due to movement of the horse-shoe member 81 which causes the upper end of the spring 80 to move from one side to the other of a line drawn between the pins 65 and 66. When the upper end of the spring 80 moves to the right of a line drawn between the centers of the pins 65 and 66 (Figure 2) the valve actuating member 70 will snap over to its opposite position in which the leg 73 will engage the left hand side of the pin 66. Also, when the horse-shoe member is moved so that the upper end of the spring 80 moves from right to left across a line drawn between the centers of the pins 65 and 66 the member 70 will snap over to the left until the leg 74 strikes the pin 66. When this snap-over movement of the member 70 takes place the button valve 62 will also be shifted. The thin metal friction member 68 is interposed between the members 64 and 70 to prevent the button valve from moving too freely and to maintain it in one position until moved into another by the member 70.

In order to cause the above described movement of the horse-shoe member 81 and the upper end of the spring 80 we have provided a swinging yoke member 82 which is pivotally mounted at its lower end on the pin 66. This yoke member 82 is illustrated in detached views in Figures 27 and 28 and includes an outer rim portion 83 and a transverse bar or rib 84. On the inner side of the upper part of the rim 83 are formed gear teeth 85 which engage the teeth on the shaft 53 for purposes to be later described. A lug 86 extends upwardly from the top of the rim 83 and is provided with a slot 87 which, as will be later described, is effective in moving the valve which controls the movement of the squeegee toward and away from the windshield. On the upper edge of the cross piece 84 is formed a cam surface 88 and a portion 89 extends from the lower edge of the transverse rib 84. A hole 90 is formed in the lug 89 into which the upper end of the horse-shoe shaped member 81 fits. The bottom end of the member 82 is bent as shown in Figures 27 and 28 and is provided with holes 91 and 92 which fit the pin 66 and provide a pivot about which the member 82 may swing.

As is seen in Figure 2 the horse-shoe shaped member 81 is provided with hook shaped ends, the lower hook carrying the upper end of the spring 80, while the upper hooked end fits into the hole 90 in the portion 89 of the cross arm 84 of the member 82. As the teeth 85 of the member 82 engage the teeth 55 on the end of the shaft 53 the oscillatory rotation of the shaft 53, carried by reciprocation of the pistons 16 and 17, will cause a corresponding oscillatory movement of the member 82 about its pivot pin 66. This movement will cause the upper end of the horse-shoe member 81 to travel in an arc and the lower end of the horse-shoe member, which carries the upper end of spring 80, will also be moved back and forth. This movement of the spring 80 will cause a snap-over action of the valve button 62 as has been previously described. The horse-shoe shaped member 81 is so shaped in order to fit around the pin 65 which supports and forms a pivot for the valve moving member 70 and it will be understood that if the pin 65 did not interfere a straight link could be substituted for the horse-shoe shaped member without changing the mode of operation.

In order to prevent the snap-over mechanism above described from operating the valve button 62 before the member 82 has traveled the desired distance and before the pistons 16 and 17 have traveled a distance great enough to give the desired movement in one direction to the wiper arms 3 and 4, we have provided means for interlocking the oscillating member 82 and the valve operating member 70 so that the member 70 cannot snap over from one extreme position to the other until the member 82 has reached a predetermined position. This is accomplished by means of a shaft 94 (see Figures 2, 12 and 13) which is rotatably supported in the hole 47 in the valve block D. A pair of diverging fingers 95 and 96 are carried at the upper end of the shaft 94 and another finger 97 extends downwardly from the shaft 94 and, in the assembled valve, lies in the same plane as the tongue 96 of the member 70 (see Figures 2 and 12). As is best seen in Figure 2 the fingers 95 and 96 are adapted to engage the cam portion 88 of the member 82 and, due to the action of the cam 88, the shaft 94 will be oscillated by the oscillatory movement of the member 82. The fingers 97 and 98, mounted on the shaft 94 and the member 70 respectively, lie in the same plane and are of such length that the finger 98 cannot move past the finger 97 until the finger 97 has moved into approximately the position shown in Figure 2 or its corresponding position on the opposite side of a vertical center line drawn through the shaft 53 and the shaft 94.

Referring particularly to Figure 2 the member 70 may be considered to have just snapped over into the position shown. This snap-over action could not take place, however, until the finger 98 could clear the end of the finger 97. When the member 82 swings to the right, which will immediately take place on account of the position of the button valve 62, the finger 97 will also be moved to the right and will prevent the member 70 from snapping over into its other position (from that shown in Figure 2) until the member 82 has reached a position on the right hand side of said center line corresponding to the illustrated position on the left hand side of the center line.

With the usual vacuum operated windshield cleaner the arc through which the cleaner bar swings varies with the speed at which the device operates. Generally speaking, the slower the speed of oscillation of the bar the smaller the angle through which the bar travels. With our interlocking mechanism just described the speed of operation of the device will not affect the time at which the valve snaps over and thus a uniform movement will be imparted to the cleaner bar regardless of the speed of operation of the device.

Figure 9:
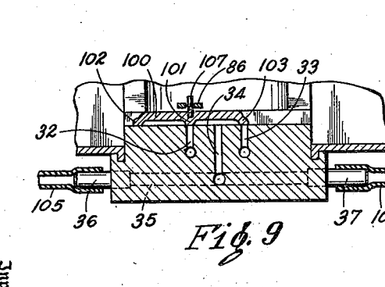
Figure 9 is a fragmentary plan section taken on line 9—9 of Figure 2.
Figure 10:
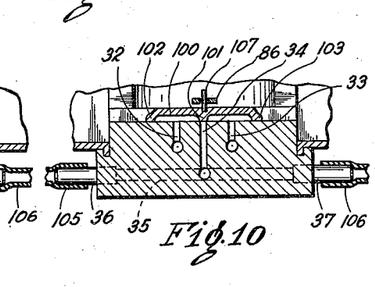
Figure 10 is a fragmentary plan section similar to Figure 9 but illustrating the valve which controls the movement of the squeegee toward and away from the windshield in another position.
Figure 11:
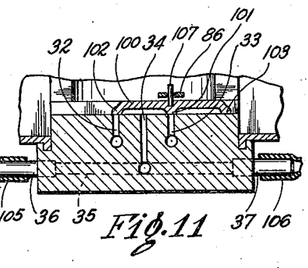
Figure 11 is another fragmentary plan section generally similar to Figure 9 but illustrating the valve which controls the movement of the squeegee toward and away from the windshield in still a third position.

Figures 9, 10 and 11 illustrate the valve mechanism which is utilized to control the flow of actuating fluid to and from the diaphragms in the members B and C which control the engagement of the cleaner bar 5 with the windshield. Figure 9 is a section taken on line 9—9 of Figure 2. In this view the slide valve 100, which is formed with the central seat portion 101 and the end seat portions 102 and 103 equally spaced from the central seat 101, is in its left hand position in which the holes or ports 32 and 33 are closed by the seats 101 and 103 respectively, the hole or port 34, which connects with the transverse passage 35 and thence to the diaphragm devices B and C through the tubes 105 and 106 respectively, is completely disconnected from the intake manifold vacuum. When this situation exists the arms 3 and 4 will be forced outwardly by suitable springs (to be described later) to lift the cleaner bar 5 away from the glass. Due to the position of the valve button 62 (Figure 2) only the port 32 will be connected to the vacuum and the port 33 will be connected to the atmosphere. Thus, as the valve 100 moves from left to right into its midposition shown in Figure 10 the vacuum in the port 32 will be shut off from the port 34 and the devices B and C. During the first half of the movement of the arms 3 and 4 from the positions 3' and 4' to 3" and 4" (Figure 1) the vacuum connections to B and C will be broken. However, as soon as the valve 100 moves beyond its central position, shown in Figure 10, the seat 101 will uncover the port 34 and connections will be established to the vacuum port 32. When this occurs the reduced pressure will be applied through the hole 35 and the tubes 105 and 106 to the devices B and C and the cleaner bar 5 will be drawn into cleaning position against the glass. These vacuum connections will be maintained until the seat 102 covers the port 32 as shown in Figure 11. At approximately the same time as this occurs the button valve 62 will be snapped over to its other position and the port 33 will become connected to the vacuum source while the port 32 will be connected to the atmosphere. Now the direction of movement of the valve 100 will be reversed and it will start to move to the left from the position shown in Figure 11. During the first one-half of its total movement to the left the port 33, which is now connected to the vacuum, will be shut off from the port 34 which leads to the devices B and C and during substantially the last one-half of the movement of the valve 100 to the left the port 34 will be connected to the port 33 and the cleaner bar 5 will be drawn into cleaning engagement with the windshield.

The valve 100 is provided with an outwardly projecting pin 107 which fits in the slot 87 in the member 82. Thus, as the member 82 is oscillated back and forth by the movement of the shaft 53, the valve 100 will be carried therewith. It will be seen from the above description that the operation of the valves 62 and 100 is synchronized and timed so that the desired movements of the various parts of the apparatus will take place at the desired times and in the proper order.

As the devices B and C are identical only the left hand device B will be illustrated and described in detail. Referring to Figures 16 to 21, the tube 105 which leads from the passage 35 in the valve block D is connected to a tube 110 which leads to the central boss 111 on the inside of the cover plate 112. A bearing 113, preferably of rubber or other material which will provide a fluid tight joint around the tubular trunnion 114, is mounted in the boss 111. The hole through the pipe 105 is extended into the chamber formed in the boss 111 (see Figure 18) and as the trunnion 114, which supports one end of the rotatable diaphragm chamber 115, is hollow, a fluid connection is provided into the interior of the diaphragm chamber 115 on one side of the flexible diaphragm 116 (Figure 19). The rotatable diaphragm chamber assembly includes a hollow shaft 117 which is secured to the diaphragm housing 115 on the side opposite to the trunnion 114. Gear teeth 118 are formed on the shaft 117 adjacent the housing 115. The diaphragm 116 is suitably clamped between the halves of the chamber 115 and carries a rod 119 which extends out through the hollow shaft 117. This rod 119 is threaded at its outer end for purposes which are later described. The side of the diaphragm 116 opposite to the hollow trunnion 114 is connected to the atmosphere through the holes 120 in the housing 115.

As has been explained above, the trunnion 114 has a bearing in the boss 111 and the shaft 117 has a bearing in a tubular extension 121 on the housing 122 (see Figure 18). This housing 122 is recessed to accommodate the gear teeth 118 on the shaft 117 and is formed with a transverse aperture 123 which guides and forms a bearing for the operating rod 10. Teeth 10' are formed on this rod 10, as seen in Figures 16 and 18, which are adapted to engage the teeth 118 on the shaft 117. As has been previously explained, the oscillation of the pistons 16 and 17 in the cylinders 11 and 12 will cause the rod 10 to move back and forth in the direction of its length. This movement will be transmitted to the shafts 117 of the devices B and C and will cause oscillatory rotation thereof. The diaphragm chamber 115 and its associated parts will also rotate with the shaft 116.

A spring 124 normally maintains the diaphragm 116 in position so that the rod 119 extends out of the shaft 117 a maximum distance. Now, when the vacuum of the intake manifold is connected to the lower side of the diaphragm 116 (Figure 19) the diaphragm will be moved and the rod 119 will be drawn into the shaft 117. This movement will cause the arms 3 and the wiper bar 5 to move inwardly so that the squeegee will engage the glass of the windshield.

As is seen in Figures 16, 17 and 19 the tubular portion 121 of the housing 122 extends through the windshield frame 125 and is held in place by a suitable nut 126. It will be understood that our mechanism may be mounted in manners other than those described if found desirable or necessary in any particular installation. The connecting or spacing bar member 2 may be secured to the housing 122 by suitable screws 127.

Figures 20, 21:
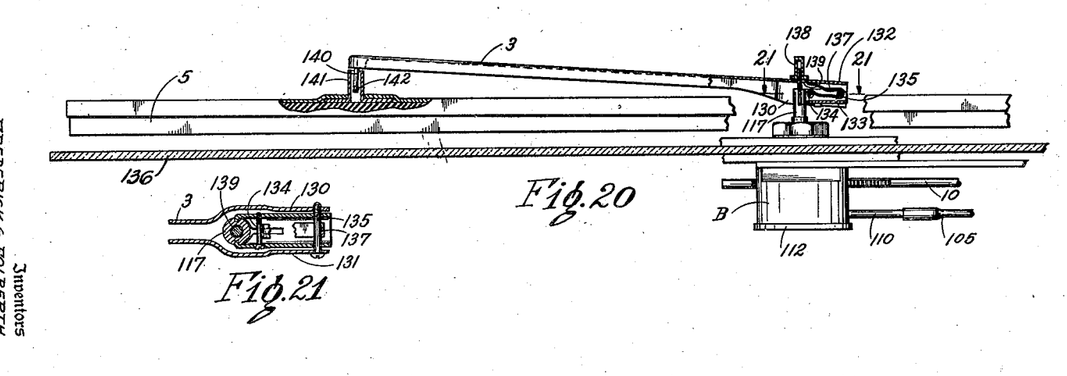
Figure 20 is a fragmentary plan section, partly in section, illustrating the wiper operating arm and one of the devices which moves the squeegee toward and away from the windshield glass.
Figure 21 is a cross section taken on line 21—21 of Figure 20.

Referring now to Figures 20 and 21, the attachment of the arm 3 to the shaft 117 will be described. The arm 3 is preferably made of channel cross section and the end, which is secured to the shaft 117, has side flange portions 130 and 131 and a connecting web 132. The outer end of the shaft 117 is grooved on opposite sides, as is seen in Figure 21. An arm member 133, also of channel cross section, is secured to the shaft 117 by its end flanges being clamped in the side grooves of shaft 117 by the screw 134. The side flanges 130 and 131 of the arm 3 fit down over the sides of the member 133 and are pivotally secured thereto by a pin or screw 135. Thus, it will be seen that the arm 3 is rotated with the shaft 117 but is also free to move toward and away from the windshield glass 136 (Figure 20). Normally the arm 3 is held away from the glass by the spring 137, which, as seen in Figure 20, engages the pins 134 and 135 and the web 132 of the arm 3. An adjustable cap 138 has threaded engagement with the ends of the threads on the rod 119. By adjusting this cap 138 the position of the arm 3 when it is away from the glass 136 may be regulated. The web 132 of the arm 3 is provided with a hole 139 through which the rod 119 extends.

When the diaphragm 116 is moved under the influence of the operating pressure to draw the rod 119 into the shaft 117, the bottom flange of the cap 138 will push against the web 132 of the arm 3 and cause the arm 3 to be swung about the pivot pin 135 until the squeegee bar 5 engages the windshield glass 136. At the outer end of the arm 3 is a pin 140 which projects toward the windshield. The squeegee bar 5 is provided with a sleeve 141 which fits over the pin 140. The fit between the pin 140 and the sleeve 141 is preferably rather loose to allow for the angular movement of the arm 3. The pin 140 may be grooved at its outer end to accommodate a transverse pin 142 which extends through the sleeve 140 and prevents the squeegee bar 5 from becoming detached from the arm 3.

The device C and its connection to the arm 4 and the squeegee bar 5 are exactly the same as those just described. It is believed that the operation of our improved windshield cleaner device will be apparent from the above description and that it will be evident that we have provided a windshield cleaner adapted to clean substantially the entire surface of an automobile windshield and to effect the cleaning only during the downward portions of the movement of the squeegee bar.

Figure 29:
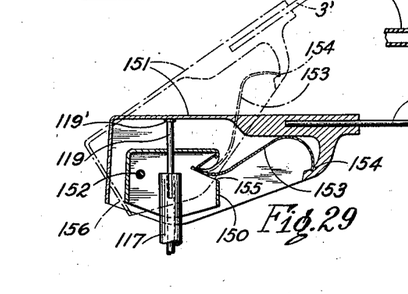
Figure 29 is a fragmentary view, partly in vertical cross section, illustrating a modified cleaner arm supporting arrangement from that shown in Figures 20 and 21.

In Figure 29 we have illustrated a modified means for supporting the arm 3', which corresponds to and performs the same functions as the arm 3 of Figures 1 and 20. In Figure 29 the rotating tubular shaft 117 and the rod 119 are substantially the same as and perform substantially the same functions as we have illustrated and described in connection with Figures 18, 19 and 20. However, in Figure 29 a spring carrying shaft end member 150 is secured to and rotates with the tubular shaft 117. The rod 119 extends through a suitable hole in the top of the member 150 and is preferably provided with a flanged head 119' which rests against but is not secured to the top of the pivoted arm supporting bracket 151. This bracket is preferably shaped substantially as shown in Figure 29 and is pivotally mounted on a pin 152 which extends through and is supported by the member 150. A relatively thin flat spring 153 has one end secured in a suitable slot in the member 150 and its other end engages a notch or groove 154 in the member 151.

When the parts are in the positions shown in full lines in Figure 29 the outer end of the spring 153 exerts a downward pressure on the member 151 and tends to hold the arm 3' and the squeegee bar supported thereby in engagement with the windshield. The rod 119 operates in exactly the same manner as was described in connection with Figures 18, 19 and 20 and it will be understood that when the arrangement of Figure 29 is used the spring 124 (see Fig. 19) will be made stronger than the spring 153 so that the diaphragm 116 will normally be held in the position shown in Figure 19. When in this position the head 119' of the rod 119 will engage the underside of the top of the member 151 and will maintain the arm 3' and the cleaner bar away from the windshield surface. When the vacuum is applied to the underside of the diaphragm 116 (Fig. 19) the diaphragm will move inwardly and the rod 119 will be moved away from the member 151 and the spring 153 will be permitted to move the arm 3' toward the windshield causing engagement of the squeege with the glass.

In dot and dash lines in Figure 29 we have illustrated the completely disengaged position of this apparatus. The spring 153 is so shaped and is so guided by the lips of the slot 155 in the member 150 that when the arm 3' is manually moved away from the windshield it reaches a point where the force of the spring 153 becomes effective to tend to continue the movement of the arm 3' away from the windshield instead of toward the windshield. This outward movement of the arm 3' will be limited by the engagement of the end of the member 151 with the lower left hand corner of the member 150, as is seen at 156 in Figure 29. This feature of our apparatus is of value in that it permits the windshield cleaner bar to be moved completely away from the windshield surface to remain in this position until it is snapped back into operating position. This greatly facilitates wiping off of the entire windshield with a cloth when it becomes dirty and does not in any way interfere with the normal operation of the windshield cleaner. It will be understood by those skilled in the art that this supporting arm construction is adapted for use with all types of windshield cleaners and might readily and advantageously be used with the usual type of cleaner having a single squeegee bar which is oscillated through an arc by the supporting arm.

Although we have described the illustrated embodiment of our invention in considerable detail it will be understood by those skilled in the art that numerous modifications, variations and changes may be made in the form and type of the mechanism employed. We do not, therefore, wish to be limited to the exact structure herein illustrated and described, but claim as our invention all embodiments thereof coming within the scope of the appended claims.

We claim:

1. In a windshield cleaner or the like, a squeegee bar extending in a substantially horizontal direction, a main fluid pressure actuated motor, operating connections between said motor and squeegee bar whereby said bar will be moved over the windshield in an arcuate path while being maintained in said substantially horizontal position, fluid pressure actuated means for moving said squeegee bar into cleaning contact with the surface of the windshield and valve means operated by said fluid pressure actuated motor for controlling said fluid pressure actuated means whereby said squeegee bar will be held in cleaning contact with said windshield only during downward movement.

2. In a windshield cleaner or the like, a main fluid pressure actuated motor and an auxiliary fluid pressure actuated motor, said main motor including a cylinder and piston operable therein, fluid pressure conducting connections from sources of different fluid pressures to said cylinder and said auxiliary motor, main valve means for controlling said fluid pressure connections to the cylinder whereby said piston will be made to move back and forth in said cylinder, said valve means being actuated by the movement of said piston, and a supplemental valve means, also actuated by movement of said piston, for controlling the fluid connections to said auxiliary motor.

3. In apparatus for cleaning a windshield glass or the like, a pair of spaced rotatable shafts supported adjacent one of the substantially horizontal edges of the glass, parallel arms mounted one on each side of said shafts, for rotation therewith, a squeegee bar pivotally supported on each of said arms at points substantially equidistant from said shafts, fluid pressure actuated means for simultaneously oscillating said shafts and arms whereby said squeegee will be given an arcuate movement over the surface of the glass while being maintained in a substantially horizontal position, supplemental fluid pressure and spring actuated means for moving the cleaning edge of the squeegee into and out of engagement with the surface to be cleaned, and means for controlling the operation of said supplemental fluid pressure and spring operated means whereby said squeegee will have cleaning engagement with the glass during a portion only of the movement of said squeegee.

4. In apparatus for cleaning a windshield glass or the like, a fluid pressure actuated motor having a valve housing and a rotatable shaft, a diaphragm housing supported in spaced relation to said valve housing, a rotatable shaft extending out from said diaphragm housing, an operating rod extending from said valve housing to said diaphragm housing and being operatively connected to said rotatable shaft in the valve housing and to said rotatable shaft extending out from said diaphragm whereby reciprocating rotation of said valve housing shaft will cause a corresponding reciprocating rotation of said diaphragm housing shaft, a squeegee supporting arm pivotally carried by said diaphragm housing shaft and extending over the windshield glass, a squeegee bar mounted on said arm, a diaphragm in said diaphragm housing, a rod connecting said diaphragm and said squeegee supporting arm whereby movement of said diaphragm will effect movement of said arm and squeegee bar carried thereby toward or away from the windshield glass, a fluid conducting conduit extending from said valve housing to said diaphragm housing, fluid conducting connections in said valve housing connecting said valve housing—diaphragm housing conduit to the source of other than atmospheric pressure and valve means actuated by rotation of the shaft in the valve housing for controlling the connections between said diaphragm chamber and the source of other than atmospheric pressure whereby said squeegee bar will be held against the windshield glass during a portion only of its movement.

5. In a windshield cleaner or the like, a squeegee bar, means for moving said squeegee bar over the windshield surface, fluid pressure and spring actuated means for effecting movement of said squeegee bar toward or away from the surface of the windshield, and valve means, operated by said means for moving said squeegee bar over the windshield, for controlling said fluid pressure and spring actuated means whereby said squeegee bar will be held in cleaning contact with said windshield only during a predetermined portion of its movement thereover.

FREDERICK G. FOLBERTH.
WILLIAM M. FOLBERTH.